April 15, 1947. H. B. BABSON ET AL Re. 22,866

WATER HEATER

Original Filed March 1, 1944 2 Sheets-Sheet 1

Inventors:
Henry B. Babson,
Chester A. Thomas,
By Britton, Wiles, Davis,
Schroeder & Hamian, Attys.

April 15, 1947. H. B. BABSON ET AL Re. 22,866

WATER HEATER

Original Filed March 1, 1944 2 Sheets-Sheet 2

Inventors:
Henry B. Babson,
Chester A. Thomas,
By Smith, Wiles, Davies,
Schroeder & Merriam, Attys.

Reissued Apr. 15, 1947

Re. 22,866

UNITED STATES PATENT OFFICE 22,866

WATER HEATER

Henry B. Babson, Chicago, and Chester A. Thomas, Crystal Lake, Ill., assignors, by mesne assignments, to Losee Products Co., a corporation of Illinois Original No. 2,408,403, dated October 1, 1946, Serial No. 524,538, March 1, 1944. Application for reissue October 18, 1946, Serial No. 703,970

19 Claims. (Cl. 219—38)

This invention relates to a water heater, and more particularly to an electric water heater of the displacement or over-flow type.

Figure 1:
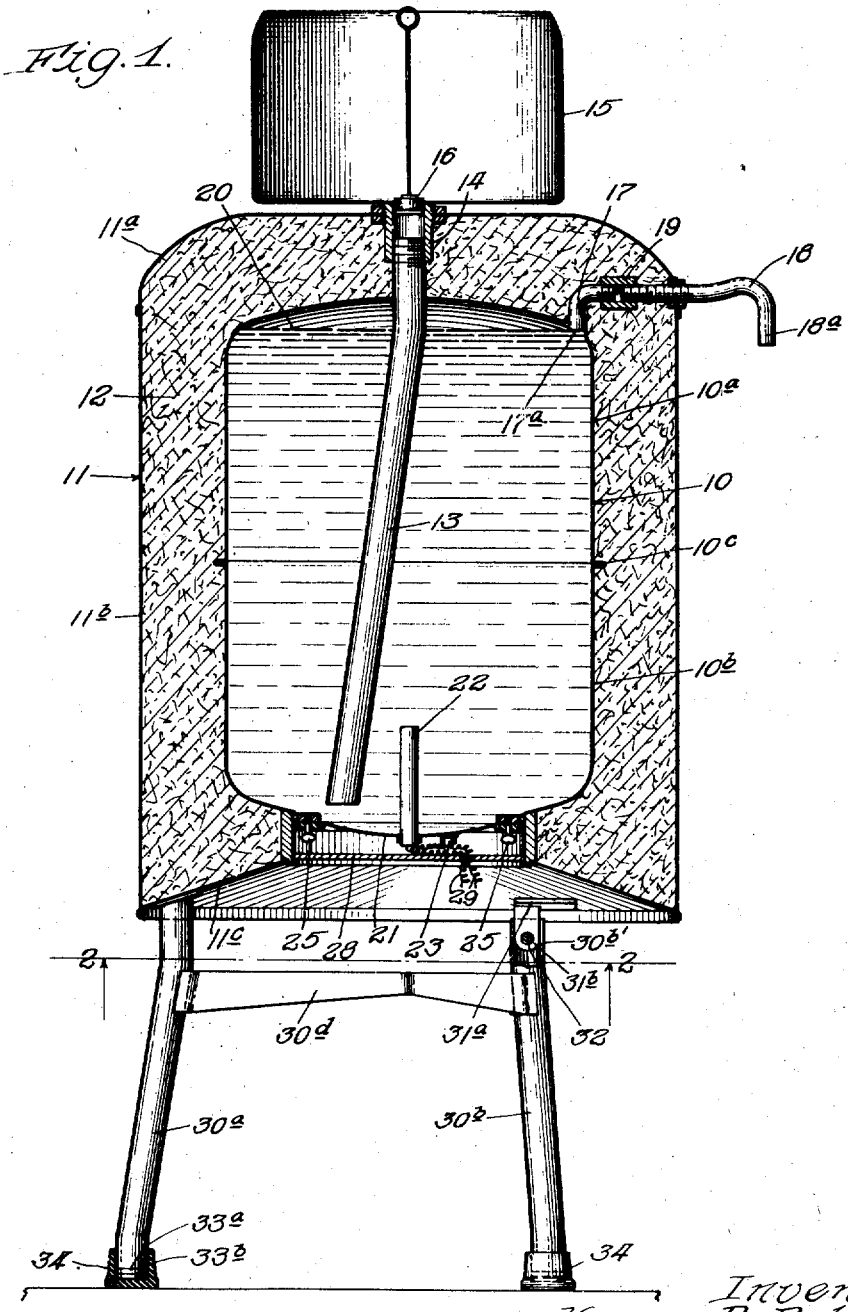
Figure 2:
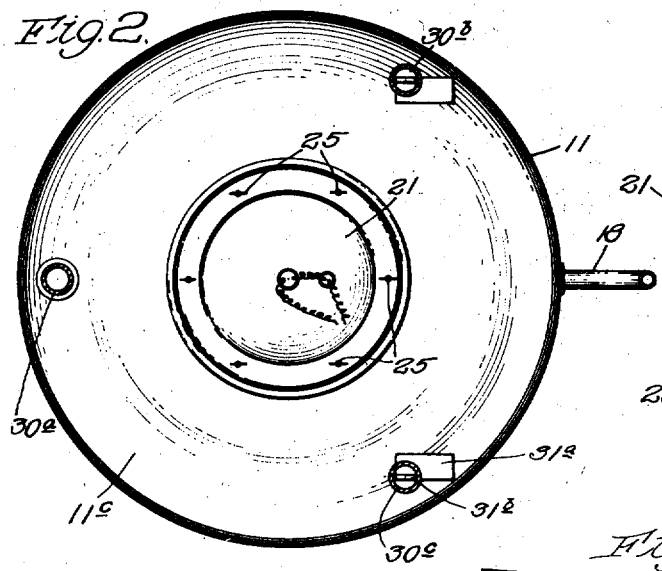
Figure 4:
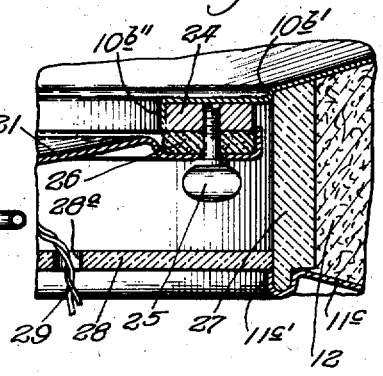
Figure 3:
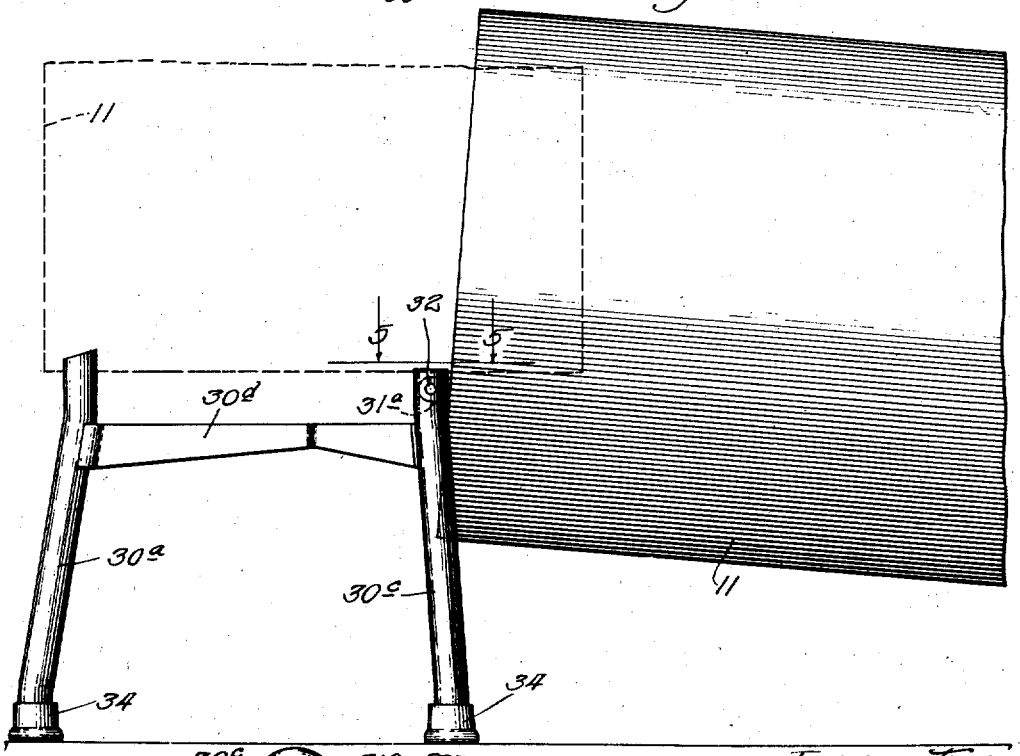
Figure 5:
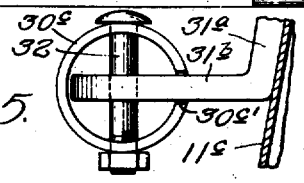

One feature of the present invention is that it provides an improved heater of the over-flow type adapted to discharge hot water from an inner reservoir tank through a delivery pipe upon the introduction of cold water to the inner tank, the introduction of cold water effecting displacement and delivery of an equal volume of hot water; another feature of this invention is the provision of an improved type of inner tank; still another feature of this invention is the provision of an opening at the bottom of the tank, and a well of larger diameter in the heat-insulating enclosure surrounding the tank, in such manner that the interior of the tank may be readily washed and cleaned; yet another feature of this invention is the provision of a closure member for the bottom opening adapted to be received in the well and to make sealing engagement with the inner tank about the periphery of the opening; a further feature of this invention is the mounting of the electrical heating element and the thermostat control element on the closure element, so that all three of such elements may be removed as a unit and all electrical parts subject to failure can be conveniently tested and repaired; still a further feature of this invention is the provision of an improved arrangement for holding the inner tank in desired position within the insulating enclosure; yet a further feature is the provision of a pivotal connection between the upper water-holding portion of the heater and the lower base portion, facilitating tipping of the water-holding portion for easy draining, removal of the closure member with the electrical elements thereon, and washing of the tank interior; still another feature of this invention is the provision of an improved inner tank construction with rounded corners facilitating cleaning; and another feature is the provision of means at the end of each leg, in the form of removable spacing members and a cup-shaped holding member, for quick and convenient leveling of the heater on a sloping floor. Other features and advantages of this invention will be apparent from the following specification and the drawings, in which:

Figure 1 is a side view, principally in vertical section, of a heater embodying this invention; Figure 2 is a view along the line 2—2 of Figure 1, looking upwardly; Figure 3 is a partial side elevational view of the heater with the water-holding portion tipped over to draining and cleaning position; Figure 4 is an enlarged fragmentary sectional view of a portion of Figure 1; and Figure 5 is a detailed view of the pivotal connection, along the line 5—5 of Figure 3.

The present inventions comprise improvements in water heaters of the displacement type. While such heaters are adapted for a number of uses, including domestic water heating, such water heaters have found particular favor on dairy farms for use in the barns and milk houses, and the particular heater shown here was designed for such a purpose. One type of electric water heater of the displacement type now on the market is shown, for example, in Losee Reissue Patent 21,393 of March 12, 1940. The heater disclosed and claimed here has certain advantages and features, as heretofore described, not found in the heater shown in such patent.

A water heater of the displacement type comprises an inner reservoir tank, a heat-insulating enclosure, supply and delivery connections, and a heating element and thermostat control adapted automatically to maintain the water in the tank at a desired temperature, as 140° F. The tank is maintained full of water at all times, delivery therefrom being only by over-flow from the top of the tank when a new amount of water is supplied thereto. The supply connection is arranged to deliver the new water to the bottom of the tank; whereas the delivery of hot water is by over-flow at the top of the tank. By virtue of this arrangement, cold water can be poured into the heater, and an equal amount of hot water taken from the top of the heater without any reduction in temperature, the hot water tending always to stay at the top of the tank and the new cold water at the bottom. With this arrangement a farmer who wants a bucket of hot water need only walk up to the heater with a bucket of cold water, pour it in, and an equal amount of hot water is delivered either to the same or a different bucket. As may be readily seen, such a water heater is particularly convenient for dairy barns, milk houses and similar locations where there is no fuel supply for heating, and where hot water is only drawn off in relatively small quantities at spaced intervals. A heater of the type shown here can deliver practically all its contents at full heat when hot water is desired, as at milking time; and the economy of slow heating may be effected in heating up the new water before the next occasion for using hot water.

In the particuar embodiment of the invention illustrated here, an inner tank 10, which may be of copper or other non-corroding metal, is formed of top and bottom portions 10a and 10b joined at the center of the tank by an annular welded or soldered seam 10c. These top and bottom portions may be drawn from sheet metal to the desired shape by an appropriate stamping or die forming operation, with the desired openings punched or die cut therethrough. In order to eliminate sharp corners and facilitate cleaning, all changes in direction of the interior tank surface are by means of curves of substantial radius, as may be best seen from an inspection of Figure 1.

The tank is surrounded by a heat-insulating enclosure comprising an outer metal shell 11 spaced from the tank by several inches, and heat-insulating material 12, as glass wool, cork blocks or any other appropriate material. The other metal shell may be of sheet iron or steel provided with an appropriate enamel or other finish; and it is here shown as divided into three portions. These comprise a top or cap portion 11a, a main cylindrical body portion 11b, and a bottom portion 11c. The division of the outer shell into such parts facilitates its manufacture and also facilitates making of supply and delivery connections to the inner tank 10, assembly of the parts, and the insertion of the heat-insulating material.

The top of the tank and shell are provided with registering openings through which new cold water may be supplied to the tank, such new water being directed to the very bottom of the tank by use of the pipe 13 terminating near the bottom of the inner tank 10. The upper end of the pipe 13 is soldered or otherwise appropriately sealed to the opening in the top of the tank, and makes water-tight connection with a heat-insulating tube 14, which may be of hard rubber or an appropriate plastic. This tube 14 is connected to the supply opening in the center of the shell cap 11a in any appropriate manner, as by the use of lock nuts. A pouring receptacle 15 has a flanged bottom opening adapted to be closed by the stopper 16. The flange, as may be best seen in Figure 1, is a tight fit within the heat-insulating tube 14. With this arrangement a farmer carrying a bucket of cold water may pour it into the receptacle 15, place his bucket on the floor under the delivery connection to be described, and then remove the stopper 16 to permit the displacement or over-flow action to take place and deliver to the bucket a volume of hot water equal to that poured into the receptacle 15.

The top portion 10a of the tank is provided near one edge, and an inch or so below the top of the tank, with a flanged outlet opening adapted to have a pipe elbow 17 soldered or otherwise permanently connected thereto. An appropriate opening in the shell has a mounting for the delivery spigot 18 with an outer downwardly turned end 18a extending down below the lower end 17a of the inner elbow. Connection between adjacent but spaced ends of these elbow and spigot pipes 17 and 18 is made by a heat-insulating tube 19 of plastic or other appropriate material. The provision of a downwardly extending end on the delivery spigot creates a siphon action which, once delivery flow has been started, draws water in the tank down to the level here indicated as 20. Flow does not start, however, until the level in the supply pipe 13 and tank has risen to the height of the horizontal portions of the pipes 17 and 18. This provides an expansion space in the top of the pipe, enabling expansion of newly delivered cold water as it heats up without "dribbling" on the floor beneath the delivery spigot. As will be noted from the immediately preceding description of the supply and delivery connections, and the bottom mounting for the tank to be hereafter described, all connections between the inner tank and the outer shell include portions of heat-insulating material, so that there is no loss of heat through direct metal conduction.

The bottom of the tank is provided with a central opening of substantial diameter (preferably at least six or eight inches). During use of the heater, this opening is closed by a metal closure member or plate 21. This closure member is sealed to the tank about the periphery of the opening by readily removable means which will be hereafter more fully described, being better shown in Figure 4. The closure member serves as a mounting means for an electrical heating element here identified as 22 and a heat-control thermostat here identified as 23. The closure plate and two electrical elements comprise a readily removable unit, this arrangement having two advantages. In the first place, it enables that unit to be taken out for servicing or repair or even to be shipped back to the factory as a unit; and the local dealer can merely hand the farmer a new bottom unit which can be put in the heater without the use of any tools and without the need of making any connections, other than plugging the other end of the electrical cord into an appropriate wall outlet. In addition, removal of this unit provides a large opening into which the arm may be inserted for washing the interior of the tank, and results in removal of all electrical elements which might be damaged by such washing. It has been found highly desirable to provide means enabling such washing of the inside of the tank at intervals, as otherwise the tanks may become contaminated (as by introduction of milk or other matter along with the water) and hot water drawn from the heater may have an odor.

Referring now more particularly to Figures 2 and 4, the lower end arrangement of the tank and shell will be more fully described. As may be best seen in Figure 4, the metal of the bottom portion 10b of the tank is bent at 10b' to form an annular shoulder or flange encircling and concentric with the opening, the edge of the metal defining the actual opening being turned down in the portion 10b''. An annular metal element 24 of substantial thickness (as a half inch) is welded or otherwise permanently fastened to the tank immediately around the bottom opening; and it is tapped with a plurality of holes adapted to receive the threaded ends of thumbscrew studs 25. Six of these studs are shown here (see Figure 2), but it will be understood that any appropriate number may be used. The outer edge of the closure member 21 is formed in a channel (best seen in Figure 4) receiving an annular gasket 26 of rubber or other appropriate sealing material. With this arrangement the closure member may be placed in sealing relation to the tank, or readily removed therefrom, simply by putting in or taking out the thumbscrew studs 25.

A cylindrical member 27, of heat-insulating material such as plastic, is adapted to encircle and closely engage the shoulder or flange 10b' at its upper end; and to be received in a channel portion 11c' in the bottom shell portion 11c, this channel portion defining an opening in the bottom shell portion of larger diameter than and registering with the bottom opening in the tank 10. The heat-insulating cylinder 27 defines a well within which the closure member 21 is received; and it provides a rigid connection between the bottom of the tank and the bottom shell member 11c, this latter serving, in conjunction with the connections at the top of the tank, to maintain the tank rigidly in the desired position in the shell during shipment and the like. If desired, a heat-insulating disc 28, of felt or other fibrous material, may be pushed up into the well to improve the heat insulation at the bottom of the tank. This disc or pad 28 may be provided with an opening 28a for the electrical cord 29; and a cut (not shown) may extend from this opening 28a to the edge of the pad to facilitate insertion of the cord in the opening.

The water-holding portion which has heretofore been described is mounted on a base portion here shown as comprising three legs 30a, 30b and 30c, rigidly connected by a web or spider 30d. The back leg 30a (the leg opposite the spigot 18) is not connected to the base portion 11c of the shell in any way, the shell merely being adapted to abut or sit upon the upper end of the leg 30a. the other two legs 30b and 30c are connected to the water-holding portion by a pivotal connection enabling the water-holding portion to pivot about a horizontal axis through and near the upper ends of these two legs. The arrangement in connection with each of these two legs is identical, so only one will be described. Referring now more particularly to the leg 30c, and the detailed showing comprising Figure 5, it will be seen that a connecting bracket has a portion 31a fastened to the bottom portion 11c of the shell, and a downwardly extending portion 31b. This latter portion extends down several inches, being pivotally mounted on the stud 32 mounted in the upper end of the pipe forming the leg 30c. The front edge of the upper end of this pipe is provided with a slot 30c', so that the portion 31b of the mounting bracket extends out through this slot when the water-holding portion of the heater is tilted to the position shown in Figure 3. The provision of a downwardly extending portion 31b on the mounting bracket is necessary in order that the bottom of the shell may swing out and let the water-holding portion go down to the downwardly tilting angle shown in Figure 3 without its being stopped with contact of the two front legs of the base portion; and the horizontal arrangement provides a concealed mounting so that, when the heater is viewed with the side and the water-holding portion is upright the legs appear to be rigidly fastened to the bottom of the heater body. The axis of pivotal mounting, of course, must be sufficiently spaced above the floor (preferably in the neighborhood of fifteen inches or more) that the water-holding portion may assume the position illustrated in solid lines in Figure 3.

This pivotal mounting arrangement has several advantages. In the first place, it keeps the well in the bottom of the heater sufficiently high above the floor that the closure plate 21 may be readily removed when the parts are in the position shown in Figure 3. In the second place, it keeps the bottom end of the water-holding portion sufficiently higher than the top end, when in tilted position, that water readily drains from the spigot 18. This enables the entire contents of the tank to be drained out before the closure member is removed; and after the inside of the tank has been scrubbed out, it enables it to be flushed with water without any of the rinsing water remaining in the tank at the end of the washing operation. Merely pulling a water heater with rigid legs over on its side fails to have these advantages.

In addition, as may be best seen in Figure 1, the lower ends of the legs are provided with adjusting means enabling the heater to be set in an exactly vertical or upright position in spite of a slight slope in the floor. This is here accomplished by providing spacer members at the bottom of each leg, in the form of discs of metal about ⅛ of an inch thick, these being here identified as 33a and 33b. Any selected number of such slugs (up to a reasonable number) may be held in place under a leg, as the leg 30a, by a cup-like holding member 34, which may be of rubber. If the legs are initially provided with two spacer members under each, it will be apparent that these can be shifted around, in leveling, so that two of the legs have one, and the other leg has as many as six such members under it. This provides sufficient adjustment to meet floor slopes normally encountered in dairy barns or milk houses, and provides a much simpler and more practical manner of adjustment than by providing telescoping parts in the legs.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. A water heater of the character described, including: an inner tank having an opening of substantial area in the bottom thereof; a heat-insulating enclosure for said tank, the enclosure having a well registering with said opening: and an inwardly and upwardly extending bottom forming a depression; a hinge member secured to said bottom in said depression; a closure member adapted to be received in said well and to make sealing engagement with said tank to close said opening; an electrical heating element mounted in said closure member; thermostat control means mounted in said closure member, whereby all electrical elements are readily removable as a unit with the closure member; and a base portion for tiltably supporting the device and having a pivotal connection with said hinge member.

2. A water heater of the character described, including: an inner tank having an opening of substantial area in the bottom thereof; an enclosure for said tank having a well registering with said opening, the enclosure comprising an outer metal shell and heat-insulating material therewithin said outer shell having an upwardly extending concavity; a hinge member secured to said bottom in said concavity; connections at the top of the heater for supplying water to the tank and for delivering an equal volume of water overflowing from the top thereof, all connections between the tank and shell including portions of heat-insulating material; a closure member adapted to be received in said well and to make sealing engagement with said tank to close said opening; an electrical heating element mounted in said closure member; thermostat control means mounted in said closure member, whereby all electrical elements are readily removable as a unit with the closure member; and a base portion for tiltably supporting the device and having a pivotal connection with said hinge member.

3. Apparatus of the character claimed in claim 2, including readily removable means for detachably maintaining the closure member in sealing engagement with the tank about the periphery of the opening.

4. Apparatus of the character claimed in claim 2, wherein the closure member is of metal and there is an additional member of heat-insulating material adapted to be received by and retained in said well below the closure member.

5. A water heater of the over-flow type, including: a water-holding portion including an inner tank and an enclosure for said tank comprising heat-insulating material said enclosure having an inwardly and upwardly inclined bottom forming a depression; a hinge member secured to said bottom in said depression; a base portion for supporting the water-holding portion; and a pivotal connection between said base portion and hinge member.

6. A water heater of the over-flow type, including: a water-holding portion including an inner tank having an opening of substantial area in the bottom thereof, an enclosure for said tank having a well registering with said opening, the enclosure comprising an outer metal shell and heat-insulating material therewithin, all connections between the tank and shell including portions of heat-insulating material, said outer shell having an inwardly and upwardly inclined bottom forming a depression; a hinge member secured to the bottom in said depression; a closure member for said opening, and an electrical heating element and a thermostat control element mounted in said closure member; a base portion for supporting the water-holding portion; and a pivotal connection between said base portion and hinge member.

7. Apparatus of the character claimed in claim 5, including a water-delivery connection in one side of the water-holding portion near the top thereof, the pivotal connection being adjacent this side.

8. A water heater of the over-flow type, including: a water-holding portion including an inner tank having an opening of substantial area in the bottom thereof; an enclosure for said tank having a well registering with said opening, the enclosure comprising an outer metal shell and heat-insulating material therewithin, all connections between the tank and shell including portions of heat-insulating material; a closure member for said opening, and an electrical heating element and a thermostat control element mounted in said closure member; a base portion for supporting the water-holding portion; a pivotal connection between said portions; and a water-delivery connection in one side of the water-holding portion near the top thereof, the pivotal connection being adjacent this side and substantially spaced from the bottom of the base portion whereby the water-holding portion may be readily tipped to a position wherein the delivery connection end of the tank is lower than the bottom end thereof.

9. Apparatus of the character claimed in claim 6, wherein the pivotal connection includes means for spacing the water-holding portion from the axis of pivotal movement.

10. A water heater of the over-flow type including: a water-holding portion including an inner tank having an opening of substantial area in the bottom thereof; an enclosure for said tank having a well registering with said opening, the enclosure comprising an outer metal shell and heat-insulating material therewithin, all connections between the tank and shell including portions of heat insulating material; a closure member for said opening, and an electrical heating element and a thermostat control element mounted in said closure member; a base portion for supporting the water-holding portion; a pivotal connection between said portions; and a water-delivery connection in one side of the water-holding portion near the top thereof, the pivotal connection being adjacent this side and substantially spaced from the bottom of the base portion, the pivotal connection including means for spacing the water-holding portion from the axis of pivotal movement, whereby the water-holding portion may be readily tipped to a position wherein the delivery connection end of the tank is lower than the bottom end thereof.

11. A water heater of the over-flow type, including: a water-holding portion including an inner tank and an enclosure for said tank comprising heat-insulating material; a base portion for supporting the water-holding portion, the base portion comprising a plurality of legs and at least one leg having associated therewith, at the lower end thereof, a plurality of spacer members and a cup shaped holding member; and a pivotal connection between said portions.

12. A water heater of the over-flow type, including: a water-holding portion including an inner tank having an opening of substantial area in the bottom thereof; an enclosure for said tank having a well registering with said opening, the enclosure comprising an outer metal shell and heat-insulating material therewithin, all connections between the tank and shell including portions of heat-insulating material, a closure member for said opening, and an electrical heating element and a thermostat control element mounted in said closure member; a base portion for supporting the water-holding portion, the base portion comprising a plurality of legs, at least one leg having associated therewith, at the lower end thereof, a plurality of spacer members and a cup-shaped holding member; and a pivotal connection between said portions.

13. A water heater of the character described, including: an inner tank having an opening of substantial area in the bottom thereof, said tank being formed of two drawn metal end portions joined by a central annular seam and all changes in direction of the inner surface of the tank being by means of curves of substantial radius; a heat-insulating enclosure for said tank, the enclosure having a well registering with said opening; a closure member adapted to be received in said well and to make sealing engagement with said tank to close said opening; an electrical heating element mounted in said closure member; and thermostat control means mounted in said closure member, whereby all electrical elements are readily removable as a unit with the closure member.

14. A water heater of the character described, comprising: a water-holding portion including an inner tank having an opening of substantial area in the bottom thereof; an enclosure for said tank having a well registering with said opening, the enclosure comprising an outer metal shell and heat-insulating material therewithin, all connections between the tank and shell including portions of heat-insulating material; a closure member adapted to be received in said well and to make sealing engagement with said tank to close said opening; a base portion for supporting the water-holding portion; and a pivotal connection between the base portion and the water-holding portion whereby said water-holding portion may be swung from a vertical position to a lowered position with relation to the base portion.

15. A water heater of the character described, including: an inner tank having an opening of substantial area in the bottom thereof; a heat-insulating enclosure for said tank, the enclosure having a well registering with said opening, and a bottom; a hinge member secured to said enclosure bottom; a closure member adapted to be received in said well and to make sealing engagement with said tank to close said opening; an electric heating element mounted in said closure member; thermostat control means mounted in said closure member, whereby all electric elements are readily removable as a unit with the closure member; and a base portion for tiltably supporting the tank and enclosure and having a pivotal connection with said hinge member.

16. A water heater of the character described, including: an inner tank having an opening of substantial area in one end thereof, said tank being formed of two drawn metal end portions joined by a single annular seam and all changes in direction of the inner surface of the tank being by means of curves of substantial radius; a heat-insulating enclosure for said tank, the enclosure having a well registering with said opening; a closure member adapted to be received in said well and to make sealing engagement with said tank to close said opening; an electrical heating element mounted in said tank; and thermostat control means for said heating element.

17. A water heater of the character described, including: an inner tank having an opening of substantial area in one end thereof, said tank being formed of two drawn metal end portions joined by a single annular seam and all changes in direction of the inner surface of the tank being by means of curves of substantial radius; a heat-insulating enclosure for said tank, the enclosure having a well registering with said opening; a closure member adapted to be received in said well and to make sealing engagement with said tank to close said opening; an electrical heating element and thermostat control means therefor mounted in a single unit in turn mounted on said tank, whereby all electrical elements are readily removable as a unit.

18. A water heater of the character described, including: a generally cylindrical vertically arranged inner tank having an opening of substantial area in one end thereof, said tank being formed of two drawn metal end portions joined by a single annular seam and all changes in direction of the inner surface of the tank being by means of curves of substantial radius; a heat-insulating enclosure for said tank; a closure member adapted to make sealing engagement with said tank to close said opening; an electrical heating element mounted in said tank; and thermostat control means for said heating element.

19. A water heater of the character described, comprising: a water-holding portion including an inner tank having an opening of substantial area in the bottom thereof; an enclosure for said tank having a well registering with said opening, the enclosure comprising an outer metal shell and heat-insulating material therewithin; a closure member adapted to be received in said well and to make sealing engagement with said tank to close said opening; a base portion for supporting the water-holding portion; and a pivotal connection between the base portion and the water-holding portion whereby said water-holding portion may be swung from a vertical position to a lowered position with relation to the base portion.

HENRY B. BABSON.
CHESTER A. THOMAS.